(12) United States Patent
Schmidt et al.

(10) Patent No.: US 6,883,614 B2
(45) Date of Patent: Apr. 26, 2005

(54) MODULAR ACTUATOR SYSTEM FOR VALVES AND CHOKES

(75) Inventors: David A. Schmidt, Houston, TX (US); Thomas E. Neal, Hitchcock, TX (US); John W. McCaskill, Jersey Village, TX (US); Gary L. Horn, Cypress, TX (US)

(73) Assignee: Power Chokes, Cypress, TX (US)

( * ) Notice: Subject to any disclaimer, the term of this patent is extended or adjusted under 35 U.S.C. 154(b) by 3 days.

(21) Appl. No.: 10/832,778

(22) Filed: Apr. 27, 2004

(65) Prior Publication Data

US 2004/0216888 A1 Nov. 4, 2004

Related U.S. Application Data

(60) Provisional application No. 60/467,306, filed on May 2, 2003.

(51) Int. Cl.[7] .............................................. E21B 24/00
(52) U.S. Cl. ..................... 166/373; 166/316; 251/214
(58) Field of Search ................ 166/373, 66.7, 166/316, 319, 332.1, 332.5, 334.4; 251/214, 291, 308

(56) References Cited

U.S. PATENT DOCUMENTS

| | | | |
|---|---|---|---|
| 3,361,240 A | * 1/1968 | Cagle | ......................... 192/141 |
| 3,399,862 A | 9/1968 | Cerow | |
| 3,809,114 A | 5/1974 | Mueller et al. | |
| 4,493,336 A | * 1/1985 | Renfro | ........................ 137/312 |
| 4,633,897 A | 1/1987 | Effenberger | |
| 4,702,275 A | 10/1987 | Ballun et al. | |
| 4,771,807 A | * 9/1988 | Karani | ........................ 137/553 |
| 5,052,430 A | * 10/1991 | Trautwein | .............. 137/315.35 |
| 5,129,620 A | * 7/1992 | Castetter | ........................ 251/65 |
| 5,203,370 A | 4/1993 | Block et al. | |
| 5,232,198 A | 8/1993 | Boyles et al. | |
| 5,505,226 A | * 4/1996 | Breth | ........................... 137/377 |
| 5,564,461 A | 10/1996 | Raymond, Jr. et al. | |
| 6,062,539 A | 5/2000 | Kawabe et al. | |
| 6,450,477 B1 | 9/2002 | Young | |
| 2002/0117209 A1 | 8/2002 | Phipps | |

* cited by examiner

Primary Examiner—Frank Tsay
(74) Attorney, Agent, or Firm—Elizabeth R. Hall

(57) ABSTRACT

The invention contemplates a simple coupling means for interfacing linear acting actuator shafts with valves or hydraulic chokes. The coupling means of the present invention allows either an actuator or an interconnected valve or choke to be rapidly, safely, and efficiently interchanged with a replacement part. The present invention is broadly applicable to a wide variety of actuator types having rectilinear motion outputs and to a large variety of valve and choke types which are operated by linear motions, including gate valves with or without balanced stems.

29 Claims, 10 Drawing Sheets

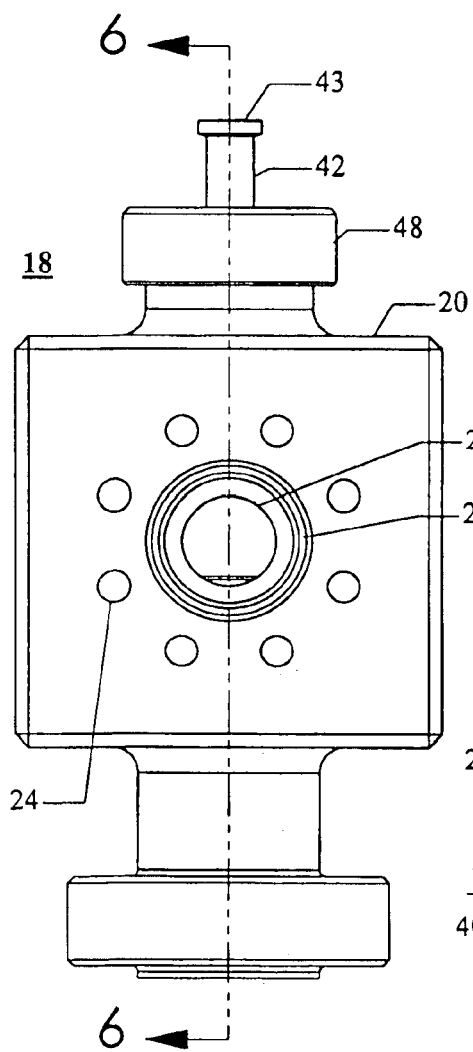
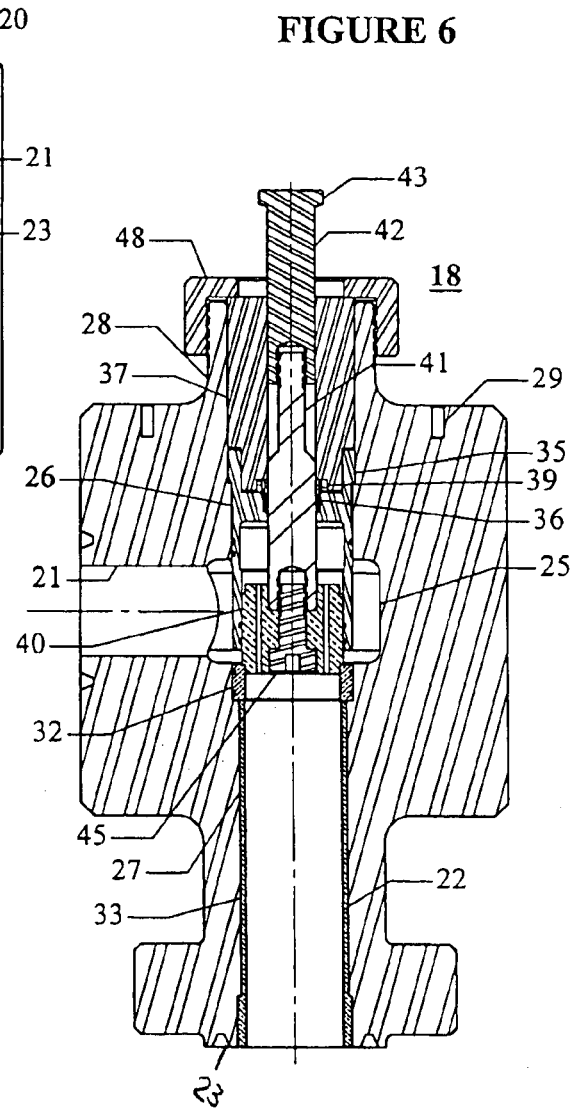
FIGURE 6
FIGURE 5

MODULAR ACTUATOR SYSTEM FOR VALVES AND CHOKES

CROSS REFERENCE TO RELATED APPLICATIONS

This application claims priority to pending U.S. patent application Ser. No. 60/467,306, filed May 2, 2003 by David A. Schmidt, et al. and entitled "Modular Actuator for Valves and Chokes."

BACKGROUND OF THE INVENTION

1. Field of the Invention

The present invention relates to a modular arrangement for the mounting of a variety of valve and choke actuators on a series of valves and chokes having standard mountings for the actuators. In particular, a mounting arrangement common to the different actuators and to the different valves and chokes permits a very simple procedure for the replacement or interchange of the equipment items based upon this design.

2. Description of the Related Art

Equipment used in the oilfield is subject to very severe operating conditions, so that equipment failures are common. Given the high cost of downtime in the oilfield, it is necessary to be able to service or replace faulty equipment items. In the normal case, it is more practical to replace or interchange the equipment than to repair it on site. Additionally, because a very large amount of oilfield equipment is rented to the rig operators, rather than sold, it is necessary to be able to quickly interchange equipment item subassemblies in order to provide a rental item which is properly configured for the requirements of the rig operator.

Traditionally, equipment items such as valves and chokes and their actuators have been repaired in the field. These equipment items have not been easy to service, given that the valves or chokes and their actuators have been closely integrated, rather than modular in construction. As a consequence, replacing an actuator typically requires partially disassembling the attached valve or choke in order to separate the piece. Naturally, replacing the valve or choke on a good actuator has required the same involved level of disassembly and reassembly.

Efforts have been made to simplify the coupling of actuators and rotary valves such as described in U.S. Pat. Nos. 4,633,897; 5,203,370; 5,564,461; 6,062,539; and 6,450,477B1. However, these solutions have not provided an easily disassembled coupling for joining the output rod of a linear actuator with the shaft of a valve or choke.

A need exists for hardware that can be more easily serviced by simple, rapid interchanges of the problematic or undesired equipment item with a functional item of the desired type. Additionally, by providing equipment subassemblies with common interface designs, the manufacturers and rental agencies and other equipment owners can maintain smaller inventories, with attendant cost savings.

SUMMARY OF THE INVENTION

The invention contemplates a simple, easy means to interface actuators with rectilinear motion outputs for valves and hydraulic chokes so that either of the items in a pair consisting of an actuator and its valve or choke can be rapidly, safely, and efficiently interchanged. The means of the present invention is broadly applicable to a wide variety of actuator types that have rectilinear motion outputs, so that it can be used with actuators that are manual or powered. Additionally, the actuators may be powered by either rotary means, such as a motor, or alternately by a linear means, such as a cylinder. Additionally, the means of the present invention is also broadly applicable to a large variety of valve and choke types which are operated by linear motions, including gate valves with or without balanced stems.

One aspect of the present invention is an apparatus for coupling a choke and an actuator, the apparatus comprising: a selectably removable coupling device coaxially aligning a distal end of a reciprocating linear acting actuator shaft and a proximal end of a choke stem; and an interface housing having a first end mounted to an actuator and a second end mounted to a choke body, the interface housing surrounds the coupling device and has at least one window in a side of the interface housing to provide access to the coupling device; whereby reciprocation of the actuator shaft reciprocates the coupling device in the interface housing thereby moving the choke stem.

Another aspect of the present invention is an apparatus for coupling a valve and an actuator, the apparatus comprising: a selectably removable coupling device coaxially aligning a distal end of a reciprocating linear acting actuator shaft and a proximal end of a valve stem; and an interface housing having a first end mounted to an actuator and a second end mounted to a valve body, the interface housing surrounds the coupling device and has at least one window in a side of the interface housing to provide access to the coupling device; whereby reciprocation of the actuator shaft reciprocates the coupling device in the interface housing thereby moving the valve stem.

An apparatus for coupling a choke and an actuator, the apparatus comprising: an interface housing having a first end mounted to an actuator and a second end mounted to a choke body, the interface housing having a hollow interior and a window in a side of the interface housing; and a coupling device surrounding a distal end of a reciprocating linear acting actuator shaft and a proximal end of a choke stem or a choke stem extension, wherein the coupling device secures the distal end of the actuator shaft and the proximal end of a positions within the hollow interior of the interface housing.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a profile view of the choke shown in FIG. 1 with the actuator removed;

FIG. 6 is a vertical longitudinal sectional view taken along cross-sectional line 6—6 of FIG. 5;

DESCRIPTION OF THE PREFERRED EMBODIMENTS

Figure 1:
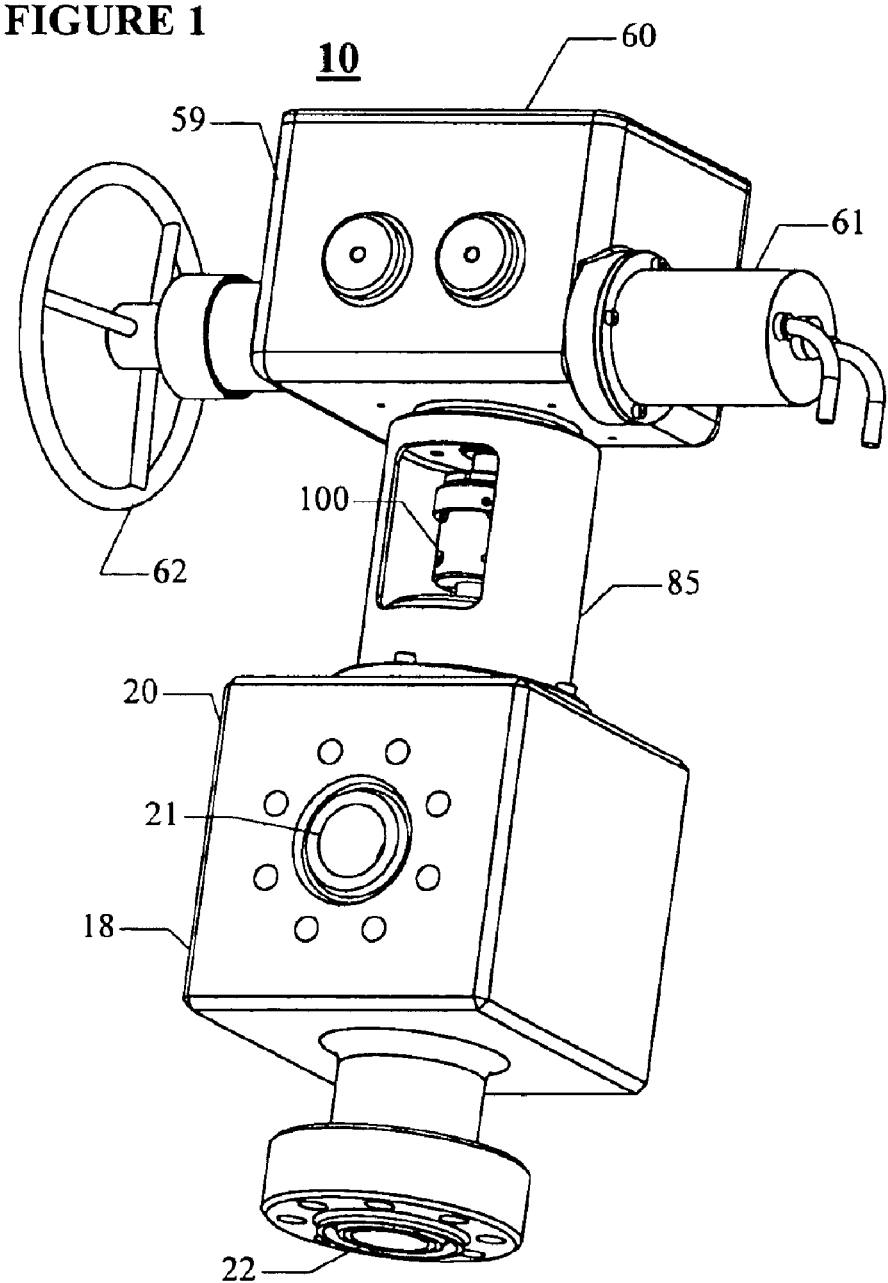
FIG. 1 is an oblique view of a hydraulic choke with its actuator mounted using the mounting means of the present invention.
Figure 2:
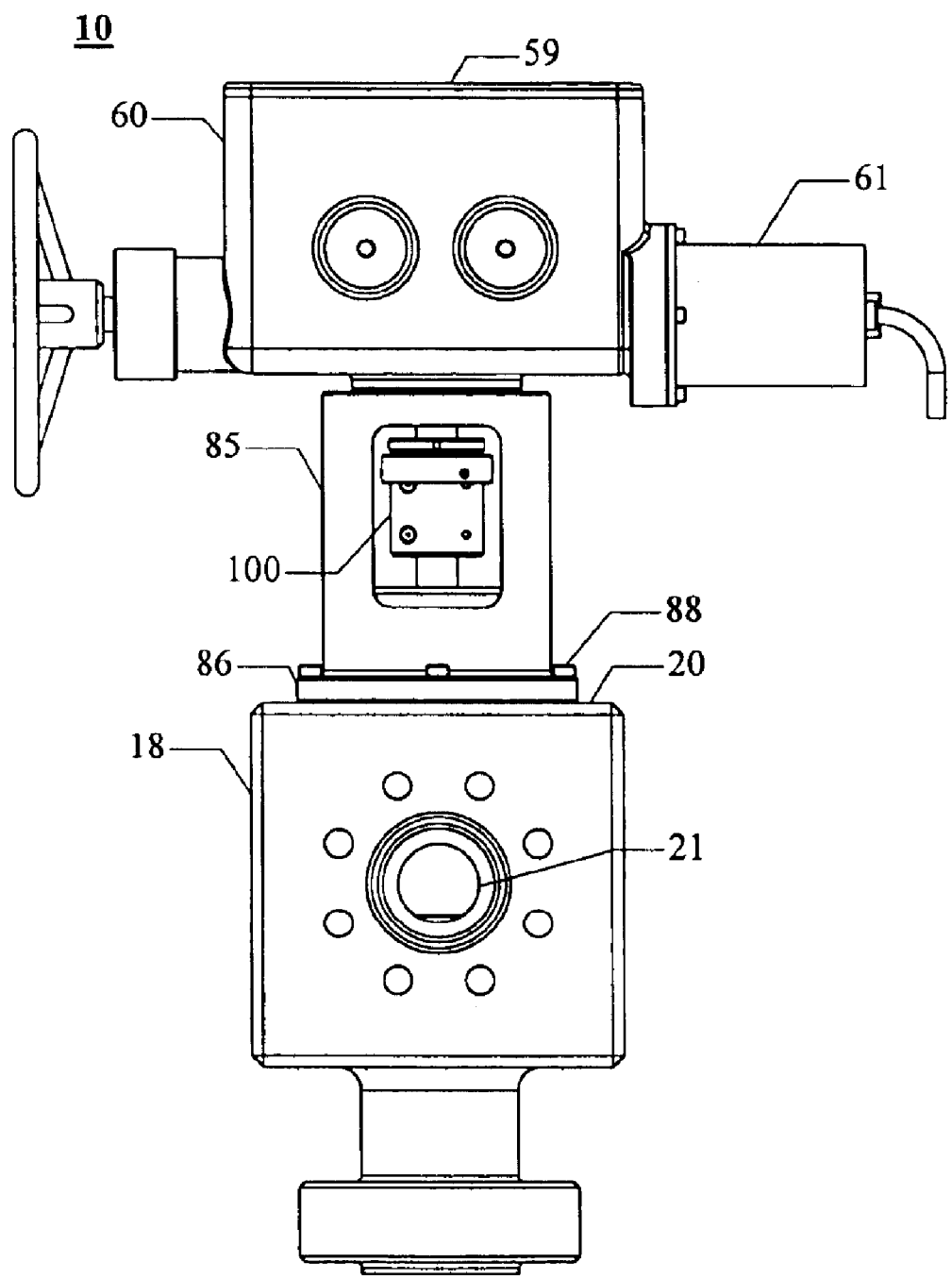
FIG. 2 is a profile view of the choke and actuator of FIG. 1 from the inlet side of the choke.
Figure 3:
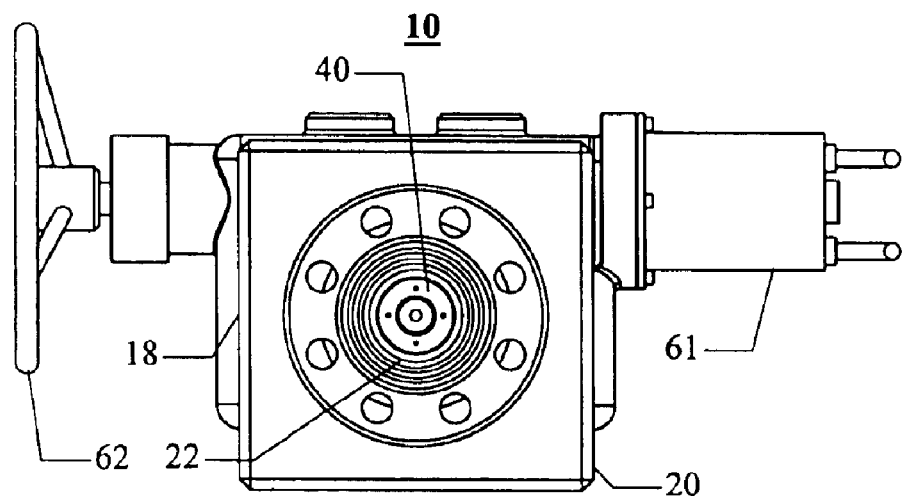
FIG. 3 is a bottom view of the choke and actuator combination shown in FIG. 1.

Referring to FIGS. 1 to 3, a hydraulic choke is coupled with an electrically powered actuator using the coupling means of the present invention. In FIGS. 1 and 2 the actuated choke system 10 is seen to consist of choke 18 and actuator 59, which are joined by means of an interface mounting flange 85, also referred to as an interface housing, that couples the choke body 20 and the actuator body 60. Additionally, the actuator shaft and the choke shaft are cojoined by means of a coupling 100. The flow entry for the choke is passage 21, and the flow exit is passage 22.

The body 20 of the choke 18 is a heavy walled steel cube with a heavy walled projecting central cylindrical neck containing coaxial outlet passage 22 extending downwardly and a second coaxial cylindrical neck 28 extending upwardly. Both the inlet and outlet flow passages 21 and 22, respectively, are provided with concentric mounting grooves 23 for metal ring gasket seals (not shown) and concentric drilled and tapped hole 24 circles for the mounting of threaded studs. The outlet flow passage has a terminal flange. The bolted and ring gasketed connections are mateable with standard American Petroleum Institute (API) flange connections typically used for high pressures in the oilfield.

The upper face of the cube of body 20 has a drilled and tapped bolt hole 29 circle concentric with the second cylindrical neck 28. These holes 29 serve to mount the interface housing 85 that is used to interconnect the body 20 of choke 18 and the body 60 of actuator 59. The upwardly extending neck 28 of body 20 has male threads on its upper end.

FIG. 5 and particularly FIG. 6, illustrate the arrangement of the choke 18. Inlet flow passage 21 into body 20 is radial to the axis of the long centrally positioned through hole extending from the actuator end to the outlet end of the body 20. A coaxial stepped through hole with multiple steps extends from the actuator end to the outlet end, with counterbored annular, approximately cylindrical entry chamber 25 centrally located in the cube of body 20. Entry chamber 25 is radially intersected by inlet flow passage 21. Upper bore 26 is straight except for a small step to a slightly larger diameter on its outward end at approximately half of its length.

Mounted in the lower bore 27 of the through hole on the outlet end of chamber 25 are a right circular annular cylindrical choke seat 32 and outlet liner 33. The seat 32 is sealingly inserted into a counterbore immediately adjacent entry chamber 25, while the outlet liner is inserted sealingly into the outlet bore of the central passage. O-rings are used to seal the exterior of seat 32 to the seat counterbore in the body. The choke gate 40 restricts the flow passage from the cavity 25 to the outlet of the choke 18.

Choke gate 40 has an approximately cylindrical shape with an axial through hole having a counterbored enlargement on each end of the through hole. Choke gate 40 is symmetrical about its transverse horizontal midplane, so that it may be inverted and a new lower sealing face used when the first becomes leaky. Choke gate 40 may have vertical internal flow passages connecting from one side to the other in order that it will not fluid lock and will be exposed to balanced opening forces when it is either fully closed or nearly closed.

Choke gate 40 is located on stem 41, which is piloted into the upper counterbored pocket of the gate through hole, and attached thereto by means of screw 45. Stem 41 is a stepped cylindrical rod that extends upwardly towards linear actuator 59. The enlarged lower end of stem 41 is drilled and tapped to threadedly engage with screw 45, while the upper end has a male thread. The portions of the choke exposed to high velocity flow, such as the gate 40, the seat 32, and the outlet liner 33, are constructed to provide extended wear and are made of materials such as sintered tungsten carbide, a ceramic, or hardfaced with a tough material.

Gate guide 35 is a thin walled cylindrical tubular structure with a short enlarged cylindrical upper end joined to the main body and having a downwardly facing exterior transverse shoulder at the transition in outer diameters. The transverse shoulder of gate guide 35 has multiple male O-ring grooves on its exterior at approximately mid length containing O-rings that seal between the exterior of guide 35 and the upper bore 26 of the body 20. The lower interior cylindrical face of gate guide 35 has multiple female O-ring grooves which seal between the gate guide and the exterior cylindrical surface of the choke gate 40. At approximately one fourth of the length of gate guide 35 down from its upper end, a thick interior transverse bulkhead with a coaxial through hole mounts multiple chevron seals 36 in a counterbore on the upper side of the through hole. The chevron seals 36 are configured to prevent the escape of internal pressure in the annular gap between gate guide 35 and stem 41, which is journaled in the central through hole of guide 35.

Seal compressor 37 is a heavy walled cylinder with a through hole having a short cylindrical counterbore on its lower end. The outer diameter of seal compressor 37 is reduced at the lower end at a transverse shoulder so that it can enter the upper section of the bore of the gate guide 35 and abut the upper end of the guide 35. The inner diameter of the seal compressor provides a slip fit to the stem 41. The upper transverse end of the seal compressor 37 projects slightly above the upper end of neck 28 of choke body 20.

A short annular cylindrical ring with a reduced outer diameter tip on its downward side serves as a seal contactor 39 for the seals 36. The bore of seal contactor 39 is a close fit to the stem 41, and the transverse tip of the seal contactor 39 bears on the heel of the uppermost of the stack of seals 36. Multiple vent holes offset from and parallel to the axis of the seal contactor 39 aid in the avoidance of fluid lock in the seal cavity.

Hollow keeper nut 48 is mounted on the externally threaded actuator side neck of the body 20 and serves to retain the internal components of the choke, which include the choke gate 40 and the stem 41, gate guide 35, seal compressor 37, and seals 36. The keeper nut 48 has a thin annular cylindrical body open at its lower end and with a female thread threadedly comated to the male thread on the upper neck 28 of choke body 20 on its interior. At the upper end of keeper nut 48 is a transverse diaphragm with a central through hole that provides a shoulder for engaging the upper transverse end of the seal compressor 37.

Stem extension 42 is a cylindrical rod with a downward facing female thread located coaxially on its lower end and an upset head 43 on its upper end. The outer diameter of stem extension 42 is the same as that of the large diameter of the stem 41, and stem extension is journaled within the bore of seal compressor 37. The upper end of the stem extension 42 extends outwardly above the neck 28 of the body 20 and the keeper nut 48. The upset head 43 of the stem extension serves to engage the coupling 100 that is used to attach the actuator rod to the choke assembly 18.

Figure 4:
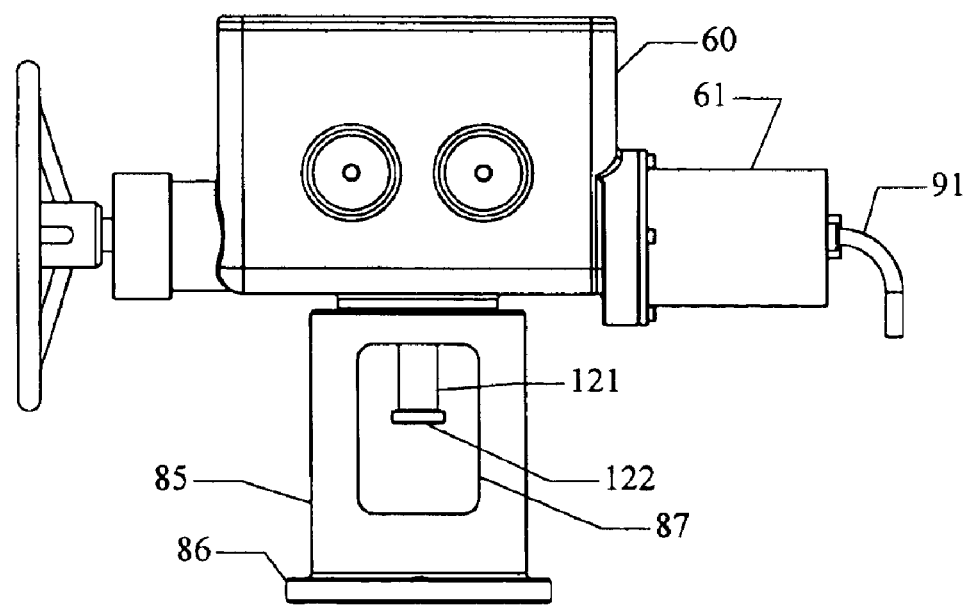
FIG. 4 is a profile view of the actuator of FIG. 1.

The actuator 59 is not described in detail, since such actuators are in very broad use and are well known to those skilled in the art. Only a general description is given here. The actuator 59 may be manually, electrically, hydraulically, or pneumatically operated. In most cases, the actuator 59 will be powered and also provided with a separate manual override, as is shown in FIG. 4. Referring to FIG. 4, the actuator box 60 is a rectangular prismatic hollow box with a removable lid and exterior mounting bosses to which the actuator drive 61 and the interface mounting flange 85 are mounted.

The actuator drive 61 is a rotary device powered by power line or lines 91. If the actuator is hydraulic or pneumatic, the lines 91 are connecting tubings; while if the actuator 61 is electric, the line 91 is a cable. Coaxial with and on the opposed side of the box 60 from the actuator drive 61 is a selectably manually engagable handwheel 62 which is normally declutched, but can be used to operate the internal worm gear drive (not shown) of the actuator if the actuator drive malfunctions. The handwheel shaft is supported in a bearing (not shown) in the external boss projecting from the actuator body 60 on the handwheel side. Internal to the body 60 is a mounted worm gear driven by the input shaft common to the drive 61 and the handwheel 62. A hollow shaft (not shown) with an internal screw thread and an attached gear driven by the worm gear provides the output for the actuator. The worm gear drive is used in order to provide a torque multiplication and speed reduction for the drive and also to resist backdriving of the actuator by thrusts on the actuator shaft.

Figure 7:
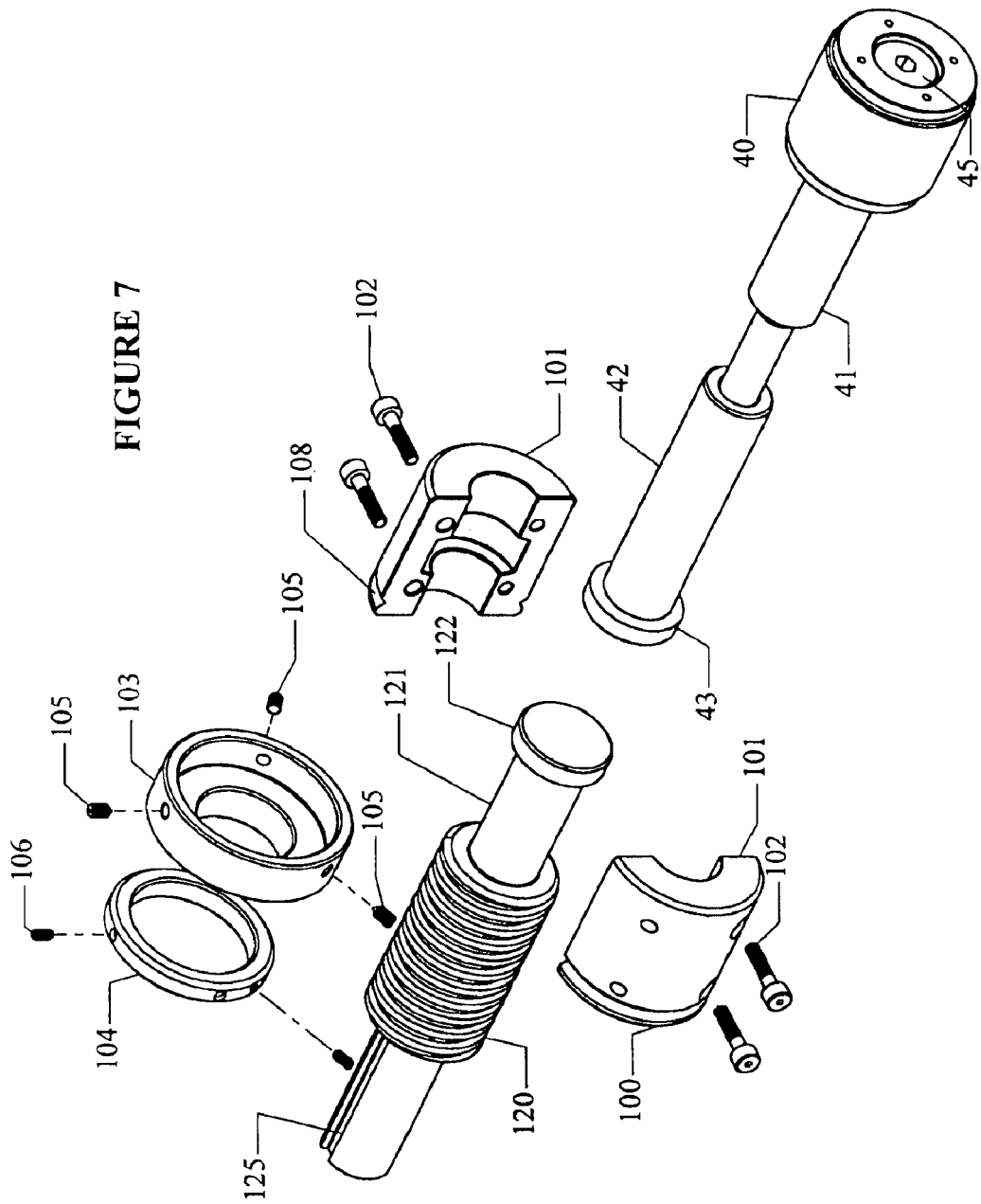
FIG. 7 is an exploded view of the coupling for joining the actuator shaft and the choke shaft of FIG. 1.
Figure 8:
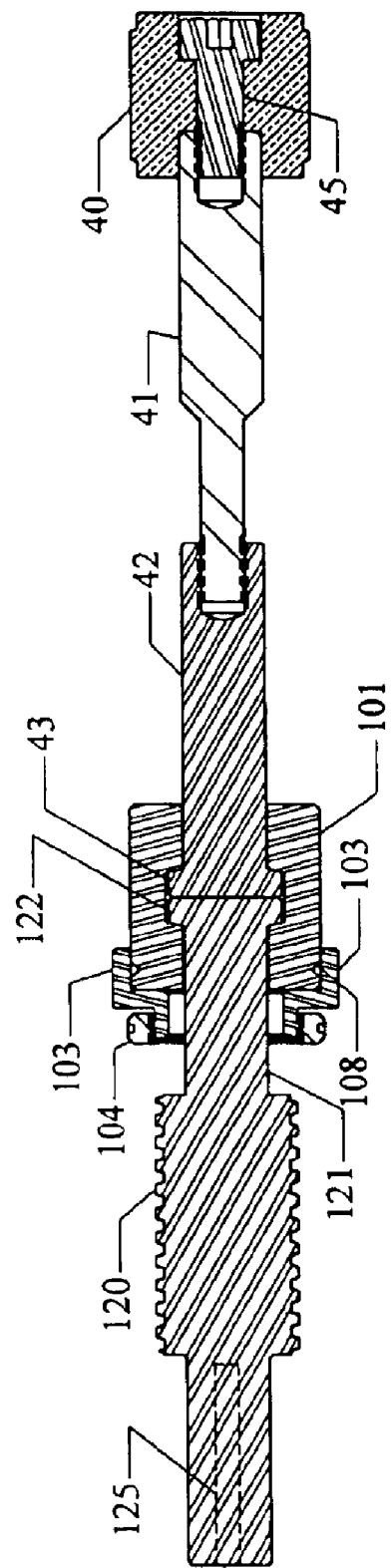
FIG. 8 is a longitudinal cross-sectional view of the assembled coupling of FIG. 7 connecting the actuator shaft and the choke shaft.
Figure 12:
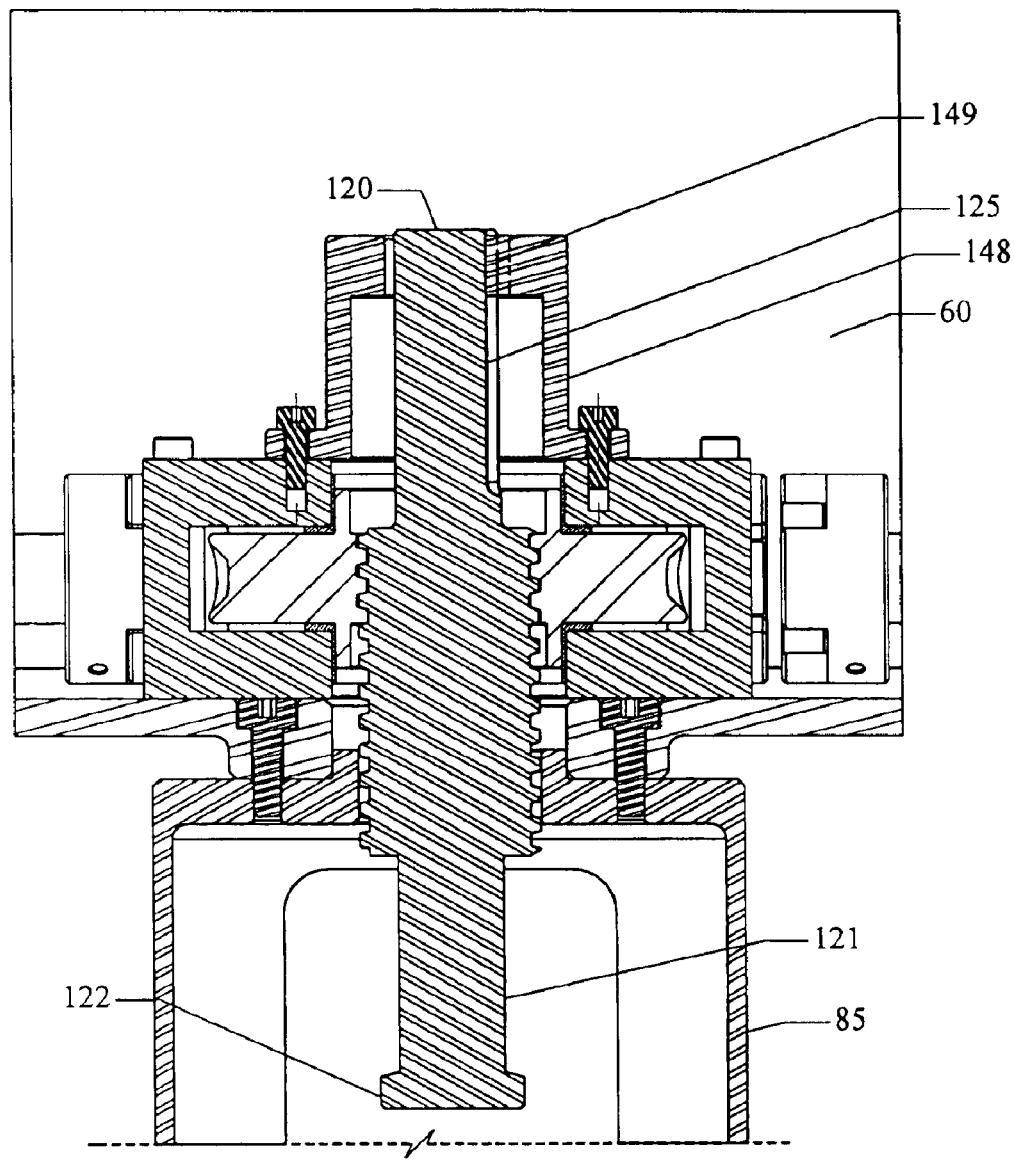
FIG. 12 is a vertical longitudinal cross-sectional view of the actuator shaft of FIG. 7 positioned in the actuator.

As seen in FIGS. 7 and 8, a nonrotating cylindrical output shaft 120 with an external thread is mounted inside the hollow shaft of the actuator. The external thread of the actuator output shaft 120 is engaged with the internal thread of the hollow shaft of the actuator. The upper end of the output shaft is an upwardly projecting reduced diameter cylinder with an extended keyway 125 parallel to its axis. As shown in FIG. 12, an antirotation sleeve 148 has a nonrotating key 149 mounted within the actuator body 60 to engage the keyway 125. The key 149 has a slip fit with the keyway 125 of the output shaft 120 so that as the shaft is screwed downwardly by the actuator, the output shaft is prevented from rotating.

At the lower end of output shaft 120 is a reduced diameter cylindrical, elongated actuator shaft end 121. The lower end of the actuator shaft end 121 has an upset head 122 substantially identical to the upset head 43 of the stem extension 42, but downwardly facing, rather than upwardly facing.

FIGS. 7 and 8 indicate how the actuator output shaft 120 of the actuator 59 and the stem extension 42 of the choke 18 are coupled by coupling 100. Coupling 100 consists of two identical halves 101 which are formed from a right circular cylinder segment having a concentric through hole and a symmetric internal counterbore that can closely fits the outwardly facing shoulders of the mated upset heads 43 and 122 of stem extension 42 and actuator shaft end 121, respectively. The exterior of the cylinder for forming the halves 101 has an external V-groove 108 at its upper end. A saw with a small kerf width diametrically splits the cylinder in order to form the clamp halves 101. The clamp halves 101 have drilled and tapped holes for engaging and drilled and counterbored holes for recessed head mounting for the clamp screws 102. The screw holes are perpendicular to the plane of the split of the cylinder for clamp halves 101. The direction of mounting of the screws 102 is such that the two clamp halves 101 are identical and can be interchanged.

Keeper sleeve 103 is a short annular cylindrical segment with a counterbore that is a close fit to the semicylindrical exteriors of the assembled clamp halves 101. The through bore of keeper sleeve 103 is larger than the outer diameter of the upset heads 43 and 122 of the stem extension 42 and the actuator shaft end 121, respectively. On its upward end, keeper sleeve has a short upwardly extending boss that has a male thread. Spaced from the transverse internal shoulder of the counterbore of the keeper sleeve 103 are multiple radial drilled and tapped holes for the mounting of cone point set screws 105. The positioning of the radial holes in the keeper sleeve is such that the cone point set screws 105 can engage the V-groove 108 of the assembled clamp halves 101 in order to assist in holding the clamp halves together and preventing rotation of the keeper sleeve 103 relative to the clamp halves 101.

Threadedly mounted on the male thread of the upwardly projecting boss of the keeper sleeve 103 is short internally threaded annular adjustment nut 104. The adjustment nut 104 has multiple radial set screw holes mounting soft point set screws 106 which can be used to lock the adjustment nut position so that the nut can be axially adjusted to abut either the bottom of the actuator box 60 or an interior shoulder of the interface mounting flange 85 in order to limit the choke opening stroke of the actuator shaft.

The interface housing or interface mounting flange 85 is a hollow cylindrical sleeve with an inwardly facing transverse diaphragm having an internal through hole at its upper end and an outwardly facing external flange 86 at its lower end. Mounting holes are provided in both the upper diaphragm and in the lower flange 86 so that the mounting flange 85 can be mounted thereby to the bottom side of the actuator box 60 of the actuator 59 and to the bolt hole 29 circle on the top of the body 20 of the choke 18, respectively. Bolts 88 are used to mount the mounting flange 85 to the body 20 of the choke 18.

One or more windows 87 are provided in the cylindrical sides of the interface housing or interface mounting flange 85 so that the interior of the mounting flange 85, where the coupling 100 is positioned, is accessible. The windows 87 permit access for assembly and disassembly of the coupling 100 so that the stem extension 42 and the actuator shaft can be coupled to transmit the axial loadings from the actuator 59 needed to operate the choke 18. Normally the interface housing or interface mounting flange 85 is connected to the actuator 59 and the choke 18 before the coupling 100 is made up.

Figure 9:
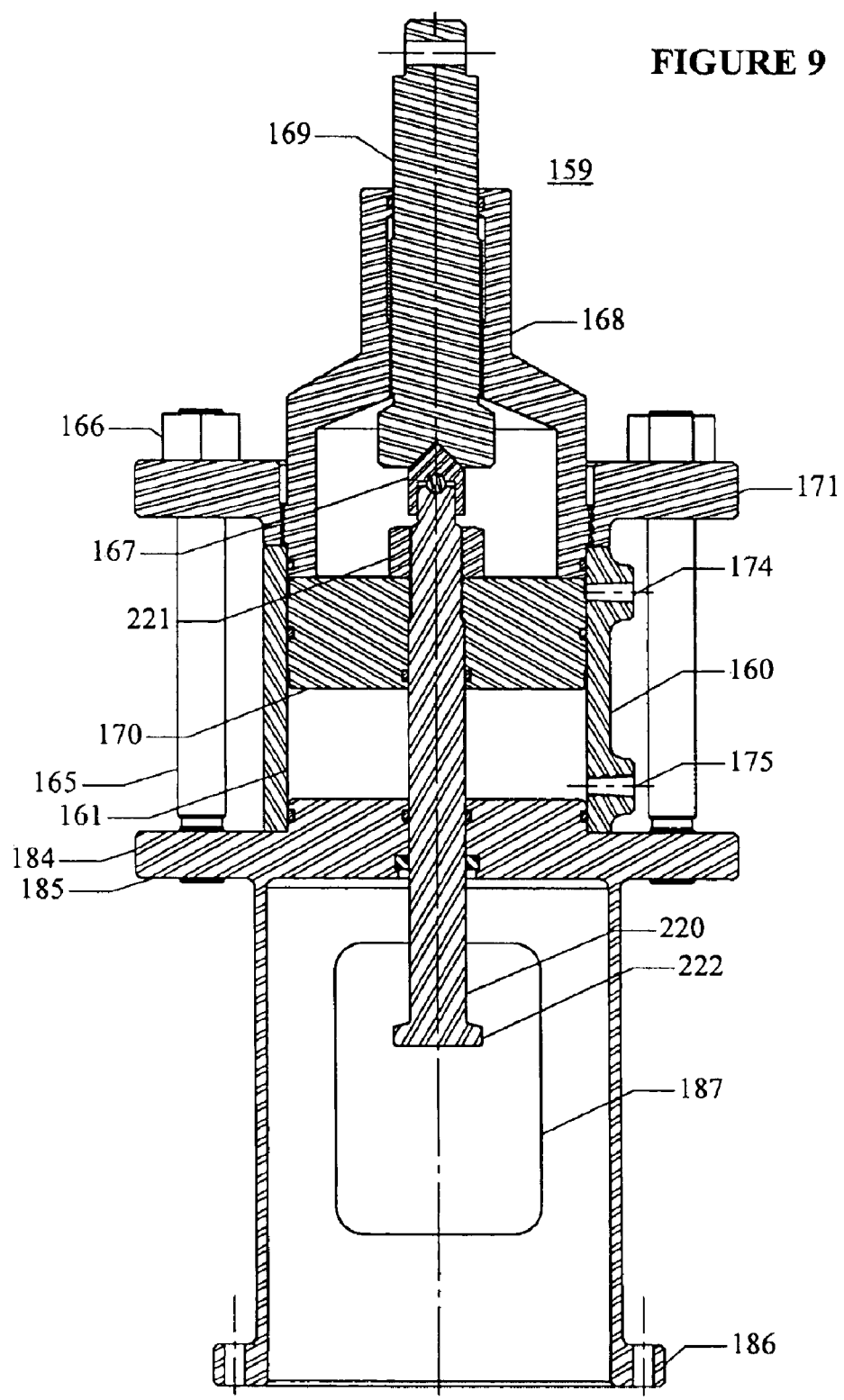
FIG. 9 is a vertical longitudinal cross-sectional view of a second type of actuator adaptable to the present invention.

Referring to FIG. 9, an alternative actuator 159 is shown. Actuator 159 uses either pneumatics or hydraulics to operate a fluid-operated cylinder in order to produce the axial loads needed to make either a valve or the choke 18 function. The actuator 159 can be used interchangeably with the actuator 59. Actuator 159 is a modified fluid operated cylinder 160 which has a cylindrical sleeve 161 housing a piston 170 and closed with both a lower rod end cap, which is also the interface mounting flange 185, for the actuator 159 and an upper end cap 168. Sleeve 161 has radial inlet ports at either end with hydraulic or pneumatic flow ports 174 and 175 attached respectively to the extend and retract ports of cylinder 160.

The rod 220 for the cylinder 160 has a cylindrical bearing face and a transverse face with a cup for a ball bearing for transmitting thrust loads at its upper end, a male thread adjacent its upper end, an extended cylindrical rod body, and a ridge adjacent the lower end which forms an upset end 222 having similar dimensions to that of the actuator rod end upset 122. The nut 221, on the upper side of piston 170, serves to retain the rod 220 in the piston.

The upper end of the cylinder 160 is sealed with a male O-ring mounted in upper end cap 168. Upper end cap 168 is a hollow cylinder with an upset lower end and an extended internally threaded upper end that mounts manually operable closing override screw 169. Adjacent the bottom end of end cap 168 is a male thread on the exterior of the end cap. Swivel 167 is attached to the lower end of override screw 169 and is engaged with the upper end of the piston rod 220 so that it can apply a closing thrust to the piston in the event of a failure of the hydraulic or pneumatic pressure source used to operate the actuator 159.

The interface mounting flange 185 is similar in construction to the interface mounting flange 85, but with the addition of an outwardly projecting flange 184 at its upper end and an upwardly extending cylindrical boss on its upper face mounting O-rings for sealing to the sleeve 161 and the rod 220 of cylinder 160. A drilled and tapped symmetrical array of holes serves to mount tie rod studs 165, which are threaded on each end. A flanged internally threaded annular collar 171 screws onto the male thread of end cap 168 and is used to axially space out the cylinder 160. A pattern of bolt holes is provided in the flange of collar 171 to engage the upper ends of tie rods 165 so that nuts 166 can be used to hold the cylinder 160 together.

Returning to the interface mounting flange 185, the mounting flange has a lower transverse flange 186 and access windows 187, substantially similar to the flange 86 and access windows 87 of the actuator 59. Closure doors may be provided for the access windows 187, but are not shown here. The actuator 159 can be readily assembled to the choke 18 by mounting the mounting flange 185 to the body 20 of the choke 18 by means of the bolts 88. The rod 220 of the actuator 159 can be coupled to the stem extension 42 of choke 18 using the same coupling 100 as before. Thus, the actuator 159 can be interchanged readily with the actuator 59 for the choke 18.

Figure 10:
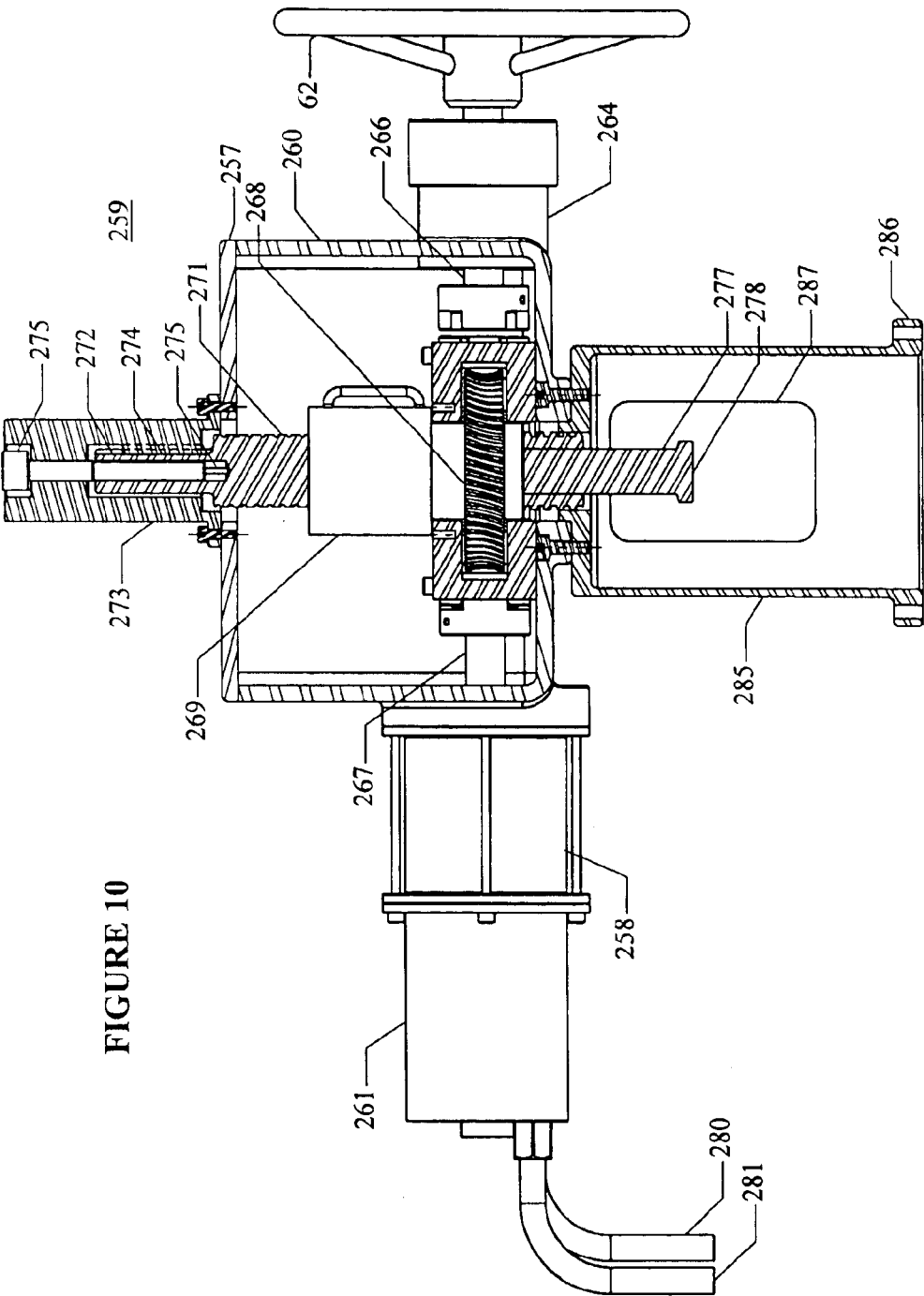
FIG. 10 is a vertical longitudinal cross-sectional view of a third type of actuator adaptable to the present invention.

FIG. 10 shows a third kind of actuator system 259 which may be utilized in the present invention. This particular actuator 259 is a ballscrew device that is either driven by a hydraulic or a pneumatic rotary motor 261 or provided with a manual override with the handwheel 62. The output shaft that extends downwardly from the ball screw 271 of the actuator 259 is constrained against rotation by a keyway 272 on the exterior of its reduced diameter upper end. The rotary actuator 261 is provided with operating fluid via connections 280 and 281 and provides input to gear reducer 258. Gear reducer 258 in turn rotates the main shaft (not shown) that mounts a worm gear (not shown). The main shaft is coaxial with the gear reducer shaft 267 and the handwheel shaft 266.

On the outer end of handwheel shaft 266 is mounted an axial slip joint with an internal spring that urges the handwheel shaft 266 outwardly. The slip joint is housed in tubular extension 264 of box 260. The inner end of the handwheel shaft slip joint has a dog clutch face that is comateable with the corresponding dog clutch face of the end of the main shaft. This arrangement permits the handwheel to be selectively engaged to manually operate the actuator system 259.

The worm gear drives a driven gear 268 with an internal coaxially mounted nontranslating ballnut 269, which in turn causes the nonrotating ball screw 271 to move up or down. The worm gear and the driven gear 268 are mounted in the actuator body 260 to which the main shaft, handwheel 62 and its slip joint, reduction gear 258, and rotary actuator 261 are mounted.

On the upper side of the actuator body 260 is mounted a ballscrew protective housing 273. The ballscrew protective housing 273 is a cylindrical tube with a transverse flange at its lower end and a transverse horizontal diaphragm with a central hole at its upper end. The ballscrew housing 273 is mounted onto the upper side of the lid 257 which is in turn positioned on the upper side of the actuator body 260. The upper end of the ballscrew housing 273 has a cylindrical recess to accommodate the enlarged upper end of a linear position sensor 275. The lower end of the ballscrew housing 273 has a short first counterbore and a second, smaller counterbore with a key 274 extending parallel to the axis of the part and engaging the keyway 272 of the ballscrew 271.

The sensor 275 is mounted in the through bore in the transverse diaphragm of the housing 273 and extends into and has its moveable element bottomed in the drilled bore in the upper end of ballscrew 271. The sensor 275 is used to monitor the actuator's position and to enable remote control of the actuator 259. Integral with and depending from the lower end of the ballscrew 271 is downwardly extending cylindrical actuator rod 277. The actuator rod 277 has an outwardly extending end flange 278 at its lower end with similar dimensions to those of the actuator rod end upset 122 of the first actuator embodiment 59.

The interface mounting flange 285 for the actuator 259 has its lower end constructed substantially identical to that of the interface mounting flange 185, but the upper end differs because of the long stroke length provided by actuator 259. Instead of the O-ringed boss of mounting flange 185, an upwardly extending cylindrical tubular extension extends above the transverse diaphragm of interface mounting flange 285 and serves to house the downward extension 277 of the ballscrew 271. The upper transverse end of mounting flange 285 is provided with a drilled and tapped bolt hole circle by which the mounting flange is attached to the bottom of actuator body 260. In place of the upward tubular extension of the mounting flange 285, a separate tubular spacer could be provided so that the interface mounting flange 185 could be used in place of the interface mounting flange 285. The bottom flange 286 and the windows 287 correspond to the similarly constructed components of the interface mounting flange 185. Access doors for the windows 287 are not shown but could readily be included for this embodiment.

The actuator 259 can be readily assembled to the choke 18 by mounting the mounting flange 285 to the body 20 of the choke 18 by means of the bolts 88. The rod 277 of the actuator 259 can be coupled to the stem extension 42 of choke 18 using the same coupling 100 as before. Thus, the actuator 259 can be interchanged readily with the actuator 59 for the choke 18.

Figure 11:
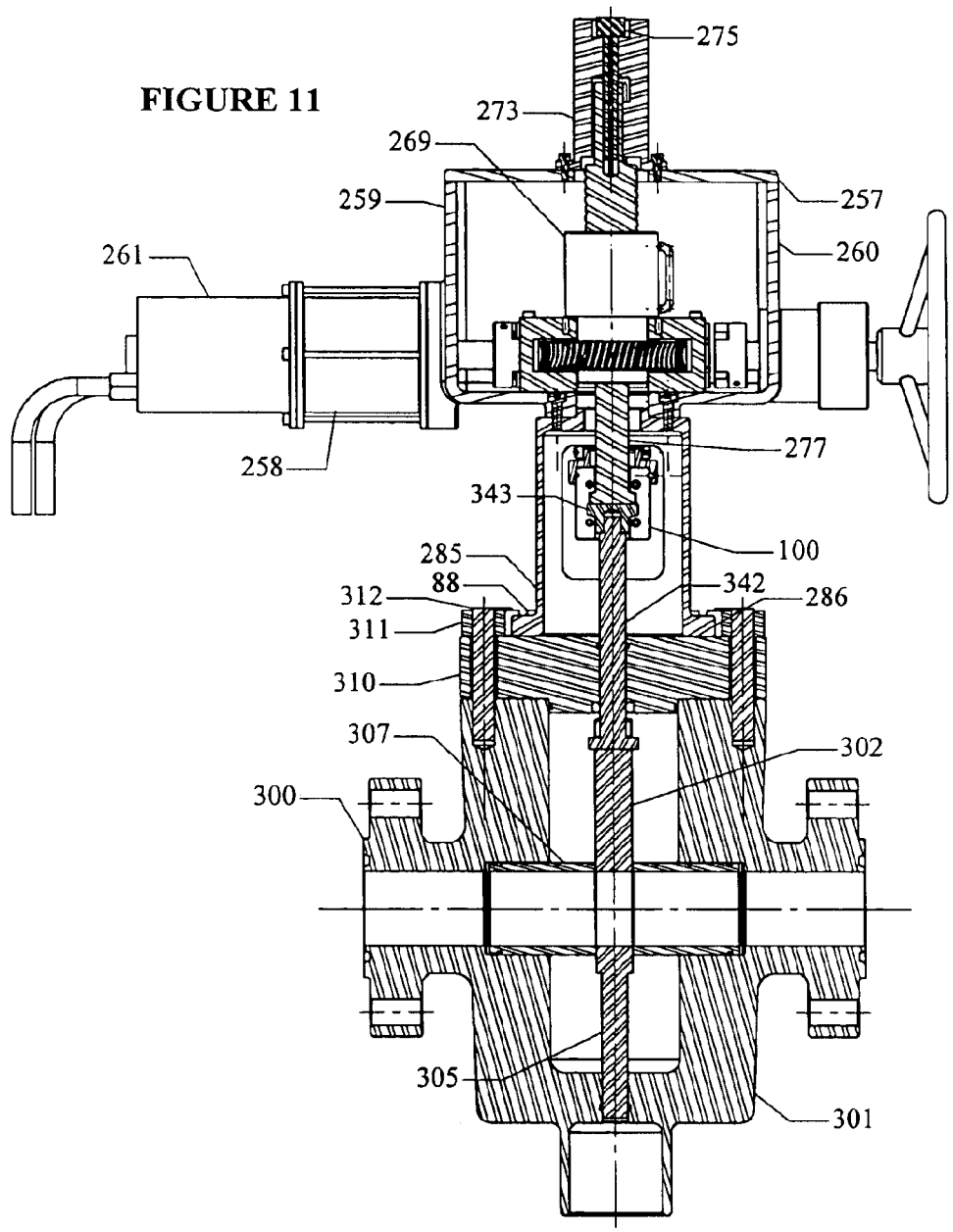
FIG. 11 is a vertical longitudinal cross-sectional view of the actuator of FIG. 10 coupled with a gate valve.

FIG. 11 shows the ballscrew actuator 259 of FIG. 10 mounted on a balanced stem gate valve 300. The balanced stem gate valve 300 has a gate body 301 with a through bore having flanged mounts provided at its outer ends for connecting into a flowline. A central valve cavity intersects the through bore and houses gate 302 and identical upstream and downstream seats 307 that sealingly mate to both the gate 302 and to the body 301. The upper transverse side of the valve body end face is provided with a gasket or sealing ring (not shown) concentric with the valve cavity hole. Additionally, the upper transverse face of the valve body 301 is provided with a concentric drilled and tapped bolt hole circle. The lower end of valve body 301 has a sealed central hole which accommodates cylindrical balance rod 305. The balance rod 305 is integral with the gate 302.

The upper valve bonnet 310 is mounted to the upper end face of valve body 301 by means of studs 312 and nuts 311. The upper end of upper valve bonnet 310 has a transverse face provided with a drilled and tapped bolt hole circle substantially identical to the bolt hole circle 92 of the choke 18. Upper valve bonnet 310 has a central sealed hole that accommodates cylindrical stem 342. Stem 342 has the same diameter as balance rod 305, so that the two rods and, hence the gate valve 300, are pressure balanced. The lower end of stem 342 has a cylindrical upset engaged into a transverse tee-slot in the upper end of valve gate 302. The stem 342 is nonrotating. The upper end of valve stem 342 has a threaded attachment to upset head 343, and is conformed similarly to the upset head on the lower end of the ball screw extension 277, so that the coupling 100 can be used to join the actuator rod and the valve stem.

Valve actuator 259 is mounted to the upper end of upper bonnet 310 of valve 300 by means of screws 88 engaging the bolt holes in the flange 286 of mounting flange 285 and the bolt hole circle of the upper bonnet 310. Coupling 100 is used to connect the actuator rod of actuator 259 to the stem 342 of valve 300 in the manner previously described.

OPERATION OF THE INVENTION

The valves and chokes shown in this invention all are operated by nonrotating linear up and down strokes of the actuators shown herein. By providing common mounting face patterns 92 and 392 on the top of the chokes 18 and valves 300 for the interface mounting flanges 85, 185, and 285, the three sample types of actuators can all be easily mounted on the samples of flow control hardware shown here for illustration. Likewise, by providing common end patterns for the valve stems or stem extensions and actuator rods (i.e., the upset heads 43, 243, 122, 222, 343 disclosed herein), the coupling of the axially reciprocating control means of the disclosed flow control hardware and the actuators is readily accomplished using coupling 100.

Whenever valves or actuators with unusual mounting patterns are encountered, adapter plates with both the standard and the irregular bolt hole patterns may readily be used to crossover the patterns and still permit the use of the standard interface mounting flange 85, 185, or 285. Likewise, the coupling 100 can be provided with a selection of spacer sleeves or filler pieces to permit adaptation of the coupling to rod ends different than the standard. Also, the mountings for the actuator rods, the stems, or stem extensions can be axially adjustable by threaded means to readily permit adaptation of this invention to different axial space-outs for the rods joined by coupling 100.

ADVANTAGES OF THE INVENTION

The invention contemplates a simple, easy means to interface actuators for valves and hydraulic chokes so that either of the items in a pair consisting of an actuator and its valve or choke can be rapidly, safely, and efficiently interchanged. The means of the present invention is broadly applicable to a wide variety of actuator types that have rectilinear motion outputs, so that it can be used with actuators that are manual or powered. Powered actuators may be powered by either rotary means, such as a motor, or alternately by a linear means, such as a cylinder.

In addition, the present invention is broadly applicable to a large variety of valve and choke types which are operated by nonrotating linear motions, including gate valves with or without balanced stems. Even nonstandard valve, choke, and actuator bolt hole circle mountings can be dealt with readily by means of adapter plates or the use of inserts in the coupling of the present invention. Thus, the present invention imparts easily interchangeable modularity to the combination of flow control equipment and actuators by virtue of a common interface means.

The installation and removal of one of a set of comated flow control equipment and an actuator requires only the installation or removal of a limited number of screws and bolts. The simplification of actuator mating to flow control equipment results in a major reduction in service times and costs. Further, the broad adaptability of the modular approach of the present invention permits a minimization of inventory and makes it easy to customize a piece of rental hardware.

Although the present invention and its advantages have been described in detail, it should be understood that various changes, substitutions and alterations can be made herein without departing from the spirit and scope of the invention as defined by the appended claims.

What is claimed is:

1. An apparatus for coupling a choke and an actuator, the apparatus comprising:
 a selectably removable coupling device coaxially aligning a distal end of a reciprocating linear acting actuator shaft and a proximal end of a choke stem or a choke stem extension member; and
 an interface housing having a first end mounted to an actuator and a second end mounted to a choke body, the interface housing surrounds the coupling device and has at least one window in a side of the interface housing to provide access to the coupling device;
 whereby axial reciprocation of the actuator shaft reciprocates the coupling device in the interface housing thereby moving the choke stem.

2. The apparatus of claim 1, wherein the coupling device has two substantially identical halves.

3. The apparatus of claim 1, wherein the coupling device encloses and fixedly positions the distal end of the actuator shaft to abut the proximal end of the choke stem or a proximal end of the choke stem extension member.

4. The apparatus of claim 3, wherein the distal end of the actuator shaft has a flat upset head abutting a flat upset head at the proximal end of the choke stem or the proximal end of the choke stem extension member.

5. The apparatus of claim 4, wherein the coupling device is cylindrical with a symmetric internal counterbore engaging the upset heads of the distal end of the actuator shaft and the proximal end of the choke stem or the choke stem extension member.

6. The apparatus of claim 1, wherein axial reciprocation of the actuator shaft is replicated by the coupled choke stem or the choke stem extension member, such axial reciprocation of the actuator shaft sufficient to move the choke between a fully open and a fully closed position.

7. The apparatus of claim 1, wherein the coupling device includes an adjustment means for adjusting a choke opening stroke length of the actuator shaft.

8. The apparatus of claim 1, wherein the interface housing is a hollow elongated cylinder.

9. An apparatus for coupling a valve and an actuator, the apparatus comprising:
- a selectably removable coupling device coaxially aligning a distal end of a reciprocating linear acting actuator shaft and a proximal end of a valve stem or a valve stem extension member; and
- an interface housing having a first end mounted to an actuator and a second end mounted to a valve body, the interface housing surrounds the coupling device and has at least one window in a side of the interface housing to provide access to the coupling device;
- whereby axial reciprocation of the actuator shaft reciprocates the coupling device in the interface housing thereby moving the valve stem.

10. The apparatus of claim 9, wherein the coupling device has two substantially identical halves.

11. The apparatus of claim 9, wherein the coupling device encloses and fixedly positions the distal end of the actuator shaft to abut the proximal end of the valve stem or a proximal end of the valve stem extension member.

12. The apparatus of claim 11, wherein the distal end of the actuator shaft has a flat upset head abutting a flat upset head at the proximal end of the valve stem or the proximal end of the valve stem extension member.

13. The apparatus of claim 12, wherein the coupling device is cylindrical with a symmetric internal counterbore securing and engaging the upset heads of the distal end of the actuator shaft and the proximal end of the valve stem or the valve stem extension member.

14. The apparatus of claim 9, wherein axial reciprocation of the actuator shaft is replicated by the coupled valve stem or the valve stem extension member, such axial reciprocation of the actuator shaft sufficient to move the valve between a fully open and a fully closed position.

15. The apparatus of claim 9, wherein the coupling device includes an adjustment means for adjusting a stroke length of the actuator shaft.

16. The apparatus of claim 9, wherein the valve is a gate valve.

17. An apparatus for coupling a choke and an actuator, the apparatus comprising:
- an interface housing having a first end mounted to an actuator and a second end mounted to a choke body, the interface housing having a hollow interior and a window in a side of the interface housing; and
- a coupling device surrounding a distal end of a reciprocating linear acting actuator shaft and a proximal end of a choke stem or a choke stem extension member, wherein the coupling device secures and positions the distal end of the actuator shaft and the proximal end of the choke stem or the choke stem extension member within the hollow interior of the interface housing.

18. The apparatus of claim 17, wherein the coupling device has two identical members formed from a tubular segment having a concentric through hole and a symmetric internal counterbore.

19. The apparatus of claim 18, wherein the members are held together by an attachment device, the attachment device accessible through the window in the interface housing.

20. The apparatus of claim 17, wherein the coupling device further includes a spacer sleeve.

21. The apparatus of claim 17, wherein the coupling device encloses and fixedly positions the distal end of the actuator shaft to abut the proximal end of the choke stem or the choke stem extension member.

22. The apparatus of claim 17, wherein axial reciprocation of the actuator shaft is replicated by the coupled choke stem or the choke stem extension member, such axial reciprocation of the actuator shaft sufficient to move the choke between a fully open and a fully closed position.

23. The apparatus of claim 22, further includes an adjustment means for adjusting a stroke length of the actuator shaft.

24. The apparatus of claim 17, wherein the actuator is powered by a rotary motor.

25. The apparatus of claim 17, wherein the actuator is operated by a hydraulic cylinder.

26. An apparatus for coupling a choke and an actuator, the apparatus comprising:
- a flanged interface housing having a first end mounted to an actuator and a second end mounted to a choke body, the interface housing having a hollow interior and a window in a side of the interface housing; and
- a coupling device surrounding and securing a distal end of a reciprocating linear acting actuator shaft and a proximal end of a choke stem or a choke stem extension member, wherein the coupling device is positioned within the hollow interior of the interface housing in alignment with the window in the interface housing.

27. An apparatus for coupling a choke and an actuator, the apparatus comprising:
- an interface housing having a first end mounted to an actuator and a flanged second end selectably mounted to a choke body, the interface housing having a hollow interior and at least one window in a side of the interface housing; and
- a removable coupling device securing a distal end of a reciprocating linear acting actuator shaft and a proximal end of a choke stem or a choke stem extension member in axial alignment, wherein the coupling device is positioned within the hollow interior of the interface housing in alignment with the window in the interface housing.

28. A coupling apparatus comprising:
- an interface housing with a first end mounted to an actuator and a flanged second end selectably mounted to a choke, wherein the interface housing has a hollow interior and at least one window in a side of the interface housing; and
- a removable coupling device having a plurality of members reversibly engaged to secure a distal end of a reciprocating linear acting actuator shaft and a proximal end of a choke stem or a choke stem extension member in axial alignment, wherein the coupling device is positioned within the hollow interior of the interface housing in alignment with the window in the interface housing.

29. A process for uncoupling a choke and an actuator coupled with a coupling apparatus having an interface housing with a first end mounted to the actuator and a flanged second end selectably mounted to the choke, wherein the interface housing has a hollow interior and at least one window in a side of the interface housing, and a removable coupling device having a plurality of members reversibly engaged to secure a distal end of a reciprocating linear acting actuator shaft and a proximal end of a choke stem or a choke stem extension member in axial alignment, wherein the coupling device is positioned within the hollow interior of the interface housing in alignment with the window in the interface housing; the uncoupling process comprising the steps of:

disengaging the members of the coupling device;
releasing the distal end of the actuator shaft from axial alignment with the proximal end of the choke stem or the choke stem extension member; and
dismounting the interface housing from the actuator.

* * * * *